United States Patent
Frazier et al.

(10) Patent No.: US 10,289,420 B2
(45) Date of Patent: May 14, 2019

(54) LIGHTWEIGHT INTERRUPTS FOR FLOATING POINT EXCEPTIONS USING ENABLE BIT IN BRANCH EVENT STATUS AND CONTROL REGISTER (BESCR)

(71) Applicant: International Business Machines Corporation, Armonk, NY (US)

(72) Inventors: Giles R. Frazier, Austin, TX (US); Michael Karl Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 350 days.

(21) Appl. No.: 14/953,308

(22) Filed: Nov. 28, 2015

(65) Prior Publication Data
US 2017/0153897 A1 Jun. 1, 2017

(51) Int. Cl.
*G06F 9/38* (2018.01)
*G06F 9/30* (2018.01)
*G06F 9/448* (2018.01)

(52) U.S. Cl.
CPC ........ *G06F 9/3861* (2013.01); *G06F 9/30101* (2013.01); *G06F 9/4486* (2018.02)

(58) Field of Classification Search
CPC ....... G06F 9/3861; G06F 9/30101; G06F 9/44
USPC ...................................................... 712/244
See application file for complete search history.

(56) References Cited

U.S. PATENT DOCUMENTS

| | | | |
|---|---|---|---|
| 5,305,455 A * | 4/1994 | Anschuetz | G06F 9/4812 710/200 |
| 5,812,439 A | 9/1998 | Hansen | |
| 6,792,492 B1 | 9/2004 | Griffin | |
| 7,849,465 B2 | 12/2010 | Zou et al. | |
| 2013/0151837 A1* | 6/2013 | Frazier | G06F 11/1438 713/100 |

OTHER PUBLICATIONS

Power ISA Version 2.07 (pp. 114-164 and 817-820). Datasheet [online].IBM, 2013 [retrieved on Mar. 13, 2017]. Retrieved from the Internet: <URL: https://static2.rpteng.com/TALOS/documentation/PowerISA_V2.07_PUBLIC.pdf>.*
J.I. Barreh, et al., "Floating Point Imprecise Interrupts in a Super Scalar System", IP.com Prior Database Technical Disclosure, Mar. 25, 2005, pp. 1-2.
Bergner et al.; "Performance Optimization and Tuning Techniques for IBM Power Systems Processors Including IBM Powers"; IBM.com/Redbooks; Aug. 2015; pp. 52 & 128 (document submitted totals 10 pages).

(Continued)

*Primary Examiner* — Aimee Li
*Assistant Examiner* — Shawn Doman
(74) *Attorney, Agent, or Firm* — Cantor Colburn LLP; Steven Chiu

(57) ABSTRACT

Embodiments relate to lightweight interrupts for floating point exceptions. An aspect includes, based on an exception occurring in a floating point unit of a processor during execution of an application, sending a lightweight interrupt corresponding to the exception to the application; and handling the exception by an exception handler of the application.

17 Claims, 4 Drawing Sheets

(56) References Cited

OTHER PUBLICATIONS

Heinrich; "MIPS R4000 Microprocessor User's Manual"; Second Edition, MIPS Technologies, Inc.; 1994; pp. 152-198 & 402 (document submitted totals 67 pages).
Waterman et al.; "The RISC-V Instruction Set Manual, vol. I: User-Level ISA, Version 2.0"; Electrical Engineering and Computer Sciences, University of California at Berkeley; May 6, 2014; pp. 6-7 & 35-42 (document submitted totals 17 pages).

\* cited by examiner

| FPE 401 | OTHER 402 | FPO 403 | OTHER 404 |

LIGHTWEIGHT INTERRUPTS FOR FLOATING POINT EXCEPTIONS USING ENABLE BIT IN BRANCH EVENT STATUS AND CONTROL REGISTER (BESCR)

BACKGROUND

The present invention relates generally to computer processor systems, and more specifically, lightweight interrupts for floating point exceptions in a computer processor system.

In computer systems that require a variety of system functions to be controlled in a nonsequential fashion, it is a common practice to employ interrupts to determine the order in which various operations are to be performed by the processor. An interrupt is generated in response to the occurrence of a predetermined event in the operation of the system. When the processor receives an interrupt request, it stops its present operation at an appropriate point and proceeds to a predetermined subroutine that controls the function associated with that particular interrupt. The predetermined condition may be an exception condition in the processor. The occurrence of an exception may result in generation of an interrupt that passes control from an application that was running at the time the exception occurred to supervisor software, so that the supervisor software can handle the exception. However, processing of interrupts by the supervisor software may negatively impact performance of the computer system.

SUMMARY

Embodiments include a method, system, and computer program product for lightweight interrupts for floating point exceptions. An aspect includes, based on an exception occurring in a floating point unit of a processor during execution of an application, sending a lightweight interrupt corresponding to the exception to the application; and handling the exception by an exception handler of the application.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 4 depicts a control register for use in conjunction with lightweight interrupts for floating point exceptions in accordance with an embodiment.

DETAILED DESCRIPTION

Figure 1:
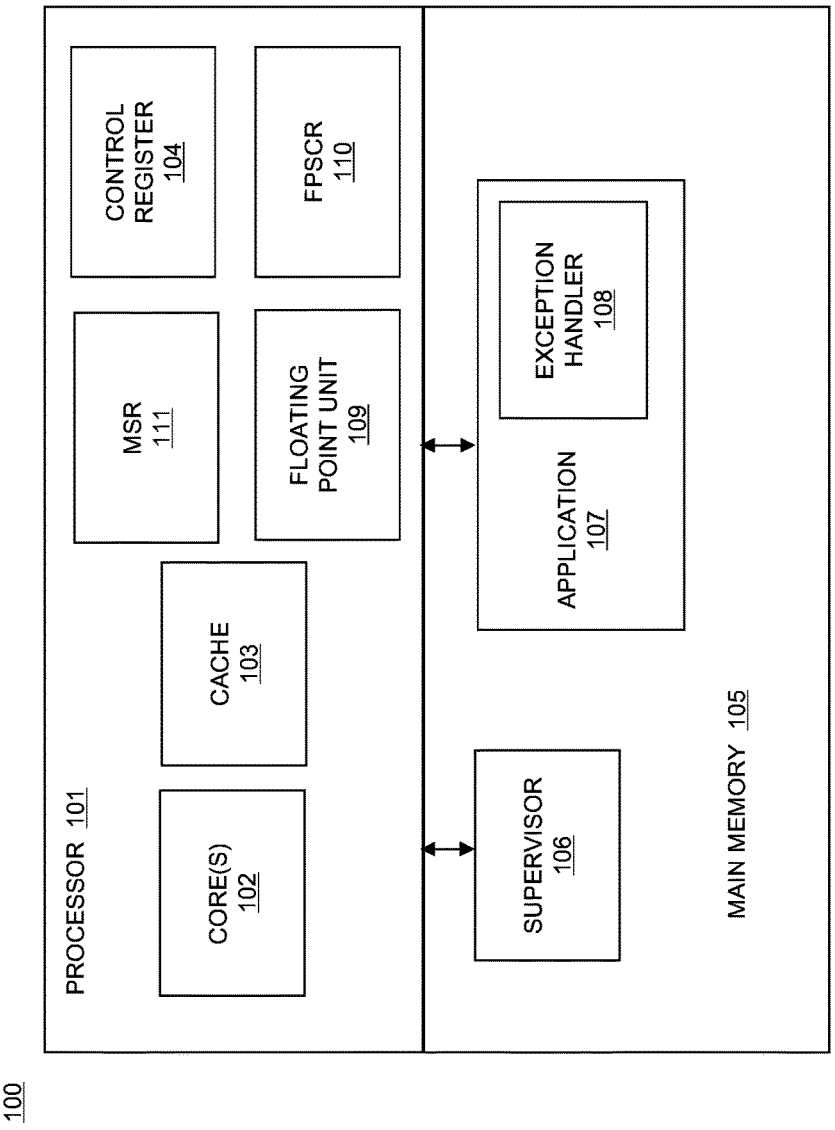
FIG. 1 depicts a computer system for lightweight interrupts for floating point exceptions in accordance with an embodiment.

Embodiments of lightweight interrupts for floating point exceptions are provided, with exemplary embodiments being discussed below in detail. A floating point unit in a processor may cause interrupts when various exception conditions occur, including but not limited to invalid operations, divide by zero, overflow, and underflow. These floating point exceptions may be handled by at the application level via a notification of the exception comprising a lightweight interrupt.

A machine state register (MSR) of a processor can be configured such that floating point exceptions that occur during execution of an application either cause floating point interrupts to supervisor software, or are ignored. If floating point exceptions are configured to cause interrupts to the supervisor, then the supervisor must take over from the application to process each floating point exception, resulting in processing delays. If the MSR is configured such that floating point exceptions do not cause interrupts, then the application needs to check the floating point status configuration register (FPSCR) to determine whether floating point exceptions have occurred. However, polling of the FPSCR by the application may also cause processing delays. Enabling lightweight interrupts to the application for floating point exceptions allows handling of floating point exceptions without incurring supervisor interrupt delays or requiring the application to poll the FPSCR. The lightweight interrupt, or event-based branch (EBB), that occurs when there is a floating point exception does not involve any action by the supervisor and is instead handled by user-level code (e.g. an application).

In some embodiments, a control register of the processor, which may comprise a branch event status and control register (BESCR), may include additional status and control bits for configuring the handling of floating point lightweight interrupts that occur as a result of floating point exceptions. The additional bits include a floating point exception enable bit and a floating point occurred bit, which are discussed below.

The floating point exception enable bit is used to enable or disable lightweight interrupts, such as EBBs, in response to floating point exceptions. The floating point exception enable bit may be set and unset by application-level software. When the floating point exception enable bit is unset, so as to disable lightweight interrupts in response to floating point exceptions, the application may poll the FPSCR after executing a floating point instruction in order to determine if the instruction resulted in a floating point exception. When the floating point exception enable bit is set, so as to enable lightweight interrupts in response to floating point exceptions, a lightweight interrupt is received by the application whenever a floating point exception occurs, and no polling is required. The occurrence of a floating point exception temporarily unsets the floating point exception enable bit and sets the floating point exception occurred bit. The floating point exception occurred bit is set when there is a floating point exception so as to indicate to the exception handler that the exception has occurred.

When the floating point exception enable bit is set, the application can execute floating point instructions without any need to poll or otherwise check the FPSCR to determine if a floating point exception has occurred, because any floating point exception will trigger a lightweight interrupt to the application. The exception handler may then take appropriate action in response to the lightweight interrupt without any involvement from supervisor software.

FIG. 1 depicts a computer system for implementing lightweight interrupts for floating point exceptions in accordance with an embodiment. Computer system 100 includes a processor 101 in communication with a main memory 105. The processor 101 includes one or more cores 102 that execute instructions using cache memory 103. Computer programs, such as supervisor 106 and application 107, are stored in main memory 105 and executed by the processor 101. The supervisor 106 may include a hypervisor and/or an operating system (OS) in various embodiments. Any appropriate number of applications may be executed by a computer system such as computer system 100. Floating point unit 109 performs floating point operations for instructions that are being processed by core(s) 102. Exceptions may occur in floating point unit 109 during execution of application 107. Examples of exceptions that may occur in floating point unit 109 include but are not limited to invalid operations, divide by zero, overflow, and underflow. The processor 101 includes various registers, including control register 104, FPSCR 110, and MSR 111. MSR 111 is configured by the supervisor 106 to disable or enable interrupts to the supervisor 106 for floating point exceptions. Based on the MSR 111, when a floating point exception occurs during execution of application 107, the exception may be handled either by an interrupt to the supervisor 106 (if the supervisor has configured the MSR 111 such that floating point exceptions cause interrupts), or by application 107 (if the supervisor has configured the MSR 111 such that floating point exceptions do not cause interrupts). FPSCR 110, associated with floating point unit 109, indicates whether an exception has occurred in the floating point unit 109. If the MSR 111 indicates that floating point exceptions do not cause interrupts to the supervisor 106, then the application uses control register 104 in processor 101 to control whether floating point exceptions cause lightweight interrupts to the application 107, or whether application 107 must poll FPSCR 110 to determine whether there was a floating point exception. The control register 104 may comprise a BESCR in some embodiments. The control register 104 contains a floating point exception enable bit and a floating point exception occurred bit, and is discussed below in further detail with respect to FIG. 4.

Figure 2:
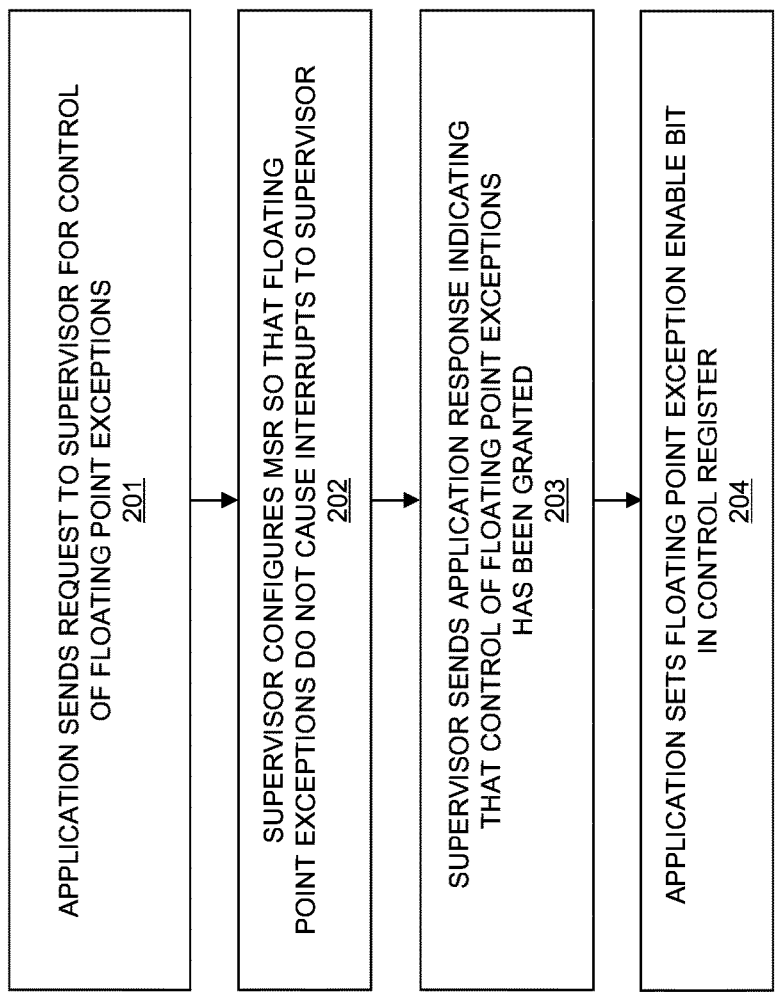
FIG. 2 depicts a process flow for configuring lightweight interrupts for floating point exceptions in accordance with an embodiment.

FIG. 2 illustrates an embodiment of a method 200 for configuring lightweight interrupts for floating point exceptions. Method 200 may be implemented in computer system 100 of FIG. 1. First, in block 201, the application 107 sends a request to the supervisor 106 requesting control of floating point exceptions. Next, in block 202, if the request of block 201 is approved by the supervisor 106, the supervisor 106 configures the MSR such that floating point exceptions do not cause interrupts to the supervisor 106. Then, in block 203, the supervisor 106 sends a response to the application 107 indicating that control of floating point exceptions has been granted to the application. Lastly, in block 204, the application 107 configures the floating point exception enable bit in the control register 104 to enable lightweight interrupts to the application 107 for floating point exceptions.

Figure 3:
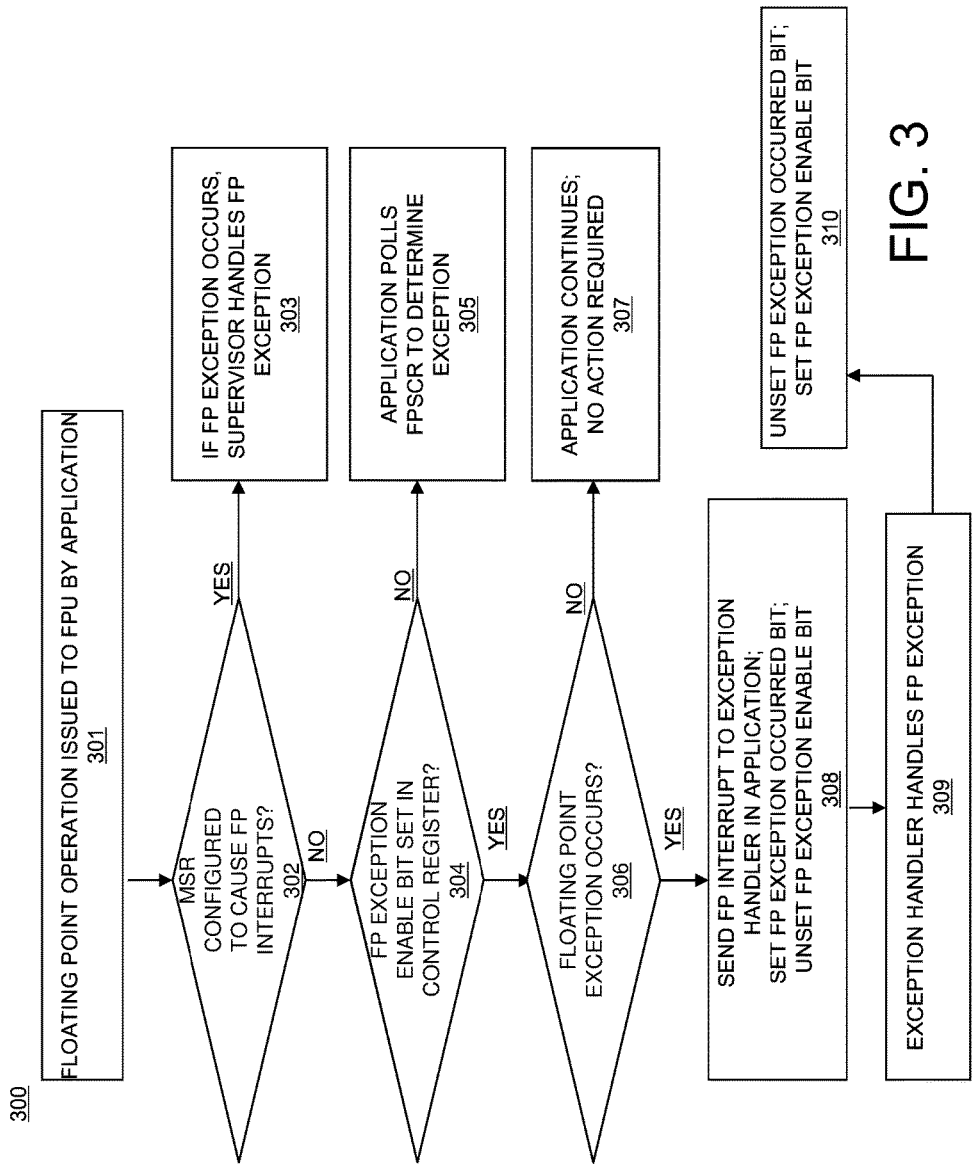
FIG. 3 depicts a process flow for implementing lightweight interrupts for floating point exceptions in accordance with an embodiment.

FIG. 3 illustrates an embodiment of a method 300 for implementing lightweight interrupts for floating point exceptions. Method 300 is implemented in computer system 100 of FIG. 1. First, in block 301, a floating point operation is issued to floating point unit (FPU) 109 corresponding to an instruction that is being processed during execution of an application 107 by processor 101. Next, in block 302, if the MSR 111 is configured such that floating point exceptions cause interrupts to the supervisor 106, then, if a floating point exception occurs in response to the floating point operation of block 301, the floating point exception is handled by the supervisor in block 303. If the MSR is configured such that floating point exceptions do not cause interrupts, then flow proceeds from block 302 to block 304, in which it is determined whether the floating point exception enable bit in the control register 104 is set. If it is determined in block 304 that the floating point exception enable bit is not set, i.e., that lightweight interrupts corresponding to floating point exceptions are disabled, then flow proceeds from block 304 to block 305. In block 305, the application 107 polls the FPSCR 110 to determine whether the floating point operation that was issued in block 301 caused an exception in the floating point unit 109.

If it is determined in block 304 that the floating point exception enable bit is set, i.e., that lightweight interrupts corresponding to floating point exceptions are enabled, then flow proceeds from block 304 to block 306. If no floating point exception occurs in the floating point unit 109 during block 306, the floating point operation that was issued in block 301 was successful. The application continues execution in block 307, and no further action is required by the application 107 with respect to the floating point operation of block 301. If a floating point exception occurs in block 306, flow proceeds to block 308. In block 308, a lightweight interrupt, such as an EBB, is sent to the exception handler 108 in the application 107 to notify the application 107 regarding the floating point exception. Also, the floating point exception enable bit is unset in control register 104, and the floating point exception occurred bit is set in control register 104. This prevents issuing of another lightweight interrupt corresponding to a floating point exception to the application 107 while the current floating point exception is being processed. Next, in block 309, the exception handler 108 handles the floating point exception. Lastly, in block 310, the floating point exception occurred bit is unset in the control register 104, and the floating point exception enable bit is reset in the control register 104, and method 300 ends. Method 300 may be repeated each time a floating point instruction is encountered during execution of an application 107.

Figure 4:
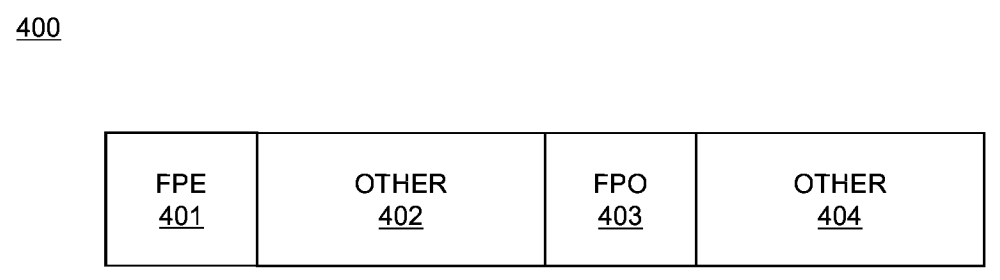

FIG. 4 illustrates an embodiment of a control register 400 for lightweight interrupts for floating point exceptions. Control register 400 may comprise a BESCR in some embodiments. Control register 400 may comprise control register 104 of FIG. 1. Control register 400 includes floating point exception enable bit (FPE) 401 and floating point exception occurred bit (FPO) 403. Application 107 may set and unset bits in control register 400 if the MSR 111 is configured to disable interrupts to the supervisor for floating point exceptions. The floating point exception enable bit 403 is set and unset as described above in block 204 of FIG. 2, and blocks 308 and 310 of FIG. 3. The floating point occurred bit 405 is set and unset as is described above in blocks 308 and 310 of FIG. 3. Floating point exceptions are handled by the application 107 by either polling the FPSCR 110 (if the application has unset the floating point exception enable bit 401 in control register 104) or receiving lightweight interrupts (if the application has set the floating point exception enable bit 401 in control register 104), as described above with respect to method 300 of FIG. 3. The control register 400 contains various other fields 402 and 404, which may comprise any appropriate status and control bits in any configuration.

Technical effects and benefits include improved performance in a computer processor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for lightweight interrupts for floating point exceptions via a branch event status and control register (BESCR) of a processor, wherein the BESCR of the processor includes a floating point exception enable bit, the computer implemented method comprising:
   determining the status of the floating point exception enable bit of the BESCR;
   when the floating point exception enable bit of the BESCR is set, based on an exception occurring in a floating point unit of the processor in response to a floating point operation issued during execution of an application, sending a lightweight interrupt corresponding to the exception to the application and handling the exception by an exception handler of the application; and
   when the floating point exception enable of the BESCR is not set, polling a floating point status configuration register (FPSCR) of the processor by the application to determine whether the exception occurred and handling the exception by the exception handler of the application.

2. The computer implemented method of claim 1, wherein the BESCR of the processor further includes a floating point exception occurred bit.

3. The computer implemented method of claim 2, further comprising, based on the exception occurring, setting the floating point exception occurred bit of the BESCR, and unsetting the floating point exception enable bit of the BESCR.

4. The computer implemented method of claim 2, further comprising, based on completion of handling of the exception by the exception handler of the application, unsetting the floating point exception occurred bit of the BESCR, and setting the floating point exception enable bit of the BESCR.

5. The computer implemented method of claim 1, wherein the lightweight interrupt is sent to the application further based on a configuration of a machine state register of the processor, and further comprising, based on the configuration of the machine state register being set to disable handling of floating point exceptions by the application, handling the exception by supervisor software.

6. A computer program product for implementing lightweight interrupts for floating point exceptions via a branch event status and control register (BESCR) of a processor, wherein the BESCR of the processor includes a floating point exception enable bit, the computer program product comprising:
   a computer readable storage medium having program instructions embodied therewith, the program instructions readable by a processing circuit to cause the processing circuit to perform a method comprising:
   determining the status of the floating point exception enable bit of the BESCR;
   when the floating point exception enable bit of the BESCR is set, based on an exception occurring in a floating point unit of the processor in response to a floating point operation issued during execution of an application, sending a lightweight interrupt corresponding to the exception to the application and handling the exception by an exception handler of the application; and
   when the floating point exception enable of the BESCR is not set polling a floating point status configuration register (FPSCR) of the processor by the application to determine whether the exception occurred and handling the exception by the exception handler of the application.

7. The computer program product of claim 6, wherein the BESCR of the processor further includes a floating point exception occurred bit.

8. The computer program product of claim 7, the method further comprising, based on the exception occurring, setting the floating point exception occurred bit of the BESCR, and unsetting the floating point exception enable bit of the BESCR.

9. The computer program product of claim 7, the method further comprising, based on completion of handling of the exception by the exception handler of the application, unsetting the floating point exception occurred bit of the BESCR, and setting the floating point exception enable bit of the BESCR.

10. The computer program product of claim 6, wherein the lightweight interrupt is sent to the application further based on a configuration of a machine state register of the processor, and further comprising, based on the configuration of the machine state register being set to disable handling of floating point exceptions by the application, handling the exception by supervisor software.

11. A computer system for lightweight interrupts for floating point exceptions, the computer system comprising:
   a memory; and
   a processor, communicatively coupled to said memory, wherein the processor includes a floating point unit and a branch event status and control register (BESCR), wherein the BESCR of the processor includes a floating point exception enable bit, wherein the computer system configured to perform a method comprising:
   determining the status of the floating point exception enable bit of the BESCR;
   when the floating point exception enable bit of the BESCR is set, based on an exception occurring in a floating point unit of the processor in response to a floating point operation issued during execution of an application, sending a lightweight interrupt corresponding to the exception to the application and handling the exception by an exception handler of the application; and
   when the floating point exception enable of the BESCR is not set polling a floating point status configuration register (FPSCR) of the processor by the application to determine whether the exception occurred and handling the exception by the exception handler of the application.

12. The computer system of claim 11, wherein the BESCR of the processor further includes a floating point exception occurred bit.

13. The computer system of claim 12, the method further comprising, based on the exception occurring, setting the floating point exception occurred bit of the BESCR, and unsetting the floating point exception enable bit of the BESCR.

14. The computer system of claim 12, the method further comprising, based on completion of handling of the exception by the exception handler of the application, unsetting the floating point exception occurred bit of the BESCR, and setting the floating point exception enable bit of the BESCR.

15. The computer implemented method of claim 1, the method further comprising when the floating point exception enable of the BESCR is set, disabling polling the FPSCR of the processor by the application.

16. The computer program product of claim 6, the method further comprising, when the floating point exception enable of the BESCR is set, disabling polling the FPSCR of the processor by the application.

17. The computer system of claim 11, the method further comprising, when the floating point exception enable of the BESCR is set, disabling polling the FPSCR of the processor by the application.

* * * * *